UNITED STATES PATENT OFFICE.

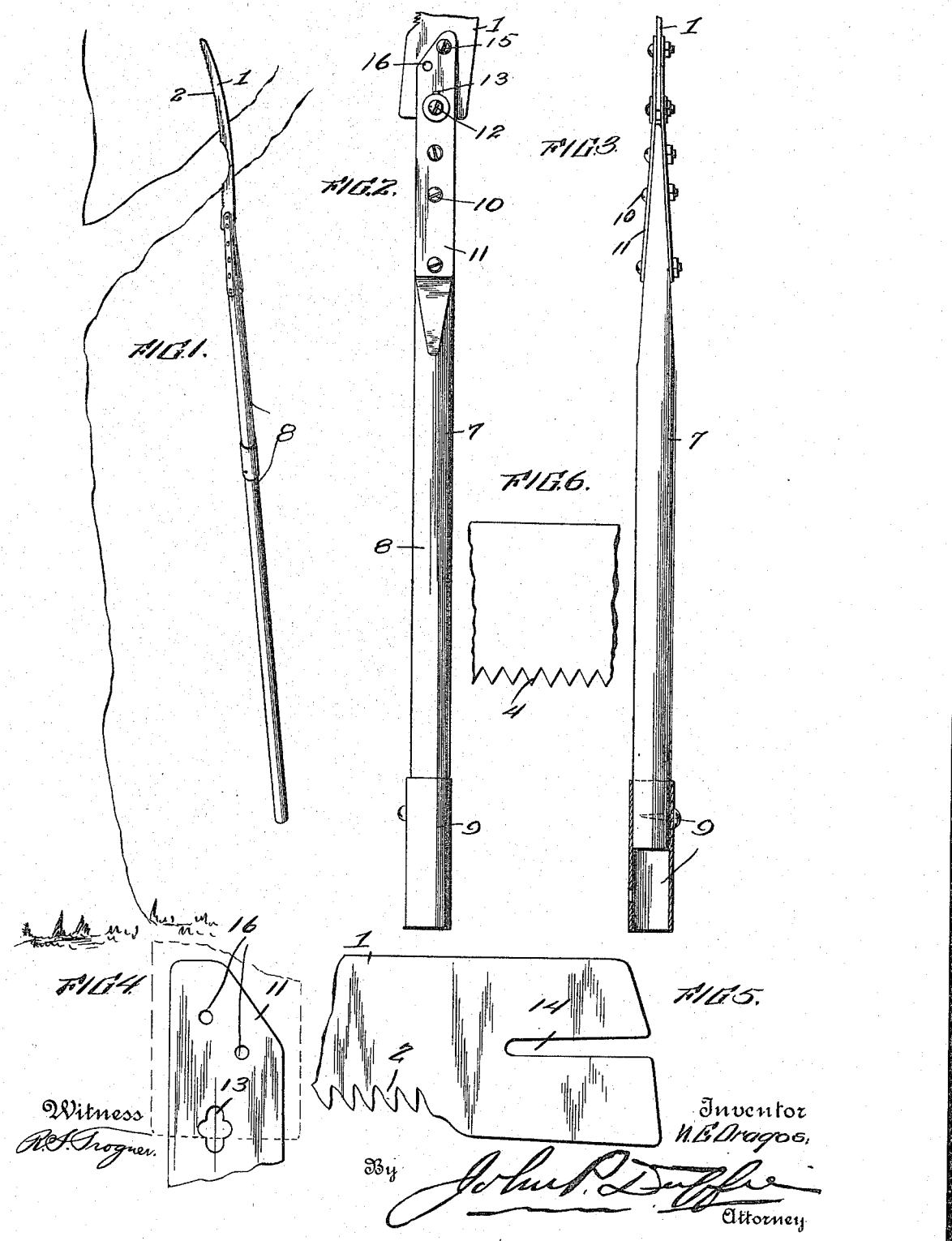

NICHOLAS E. DRAGOS, OF FREMONT, OHIO.

SAW.

1,177,024.   Specification of Letters Patent.   Patented Mar. 28, 1916.

Application filed August 16, 1915. Serial No. 45,770.

*To all whom it may concern:*

Be it known that I, NICHOLAS E. DRAGOS, a citizen of the United States, residing at Fremont, in the county of Sandusky and State of Ohio, have invented certain new and useful Improvements in Saws, of which the following is a specification.

This invention relates to improvements in saws, more especially designed for sawing limbs of trees, as in priming and topping the same, it being particularly effective for cutting "green" wood, either with exerting a pulling or pushing action upon the same.

The invention has for its object facility and convenience in aiding the securing of the desired angle of presentation of the saw for effective cutting action and the enabling the suitable grasping of the saw handle with respect to the object or tree-limb to be cut.

A further object is to provide for carrying out the aforesaid ends in a simple, expeditious, and effective manner.

The invention consists, therefore, of certain features of construction and the arrangement of parts, substantially as hereinafter fully disclosed and pointed out by the appended claims.

In the hereto-annexed drawing, is presented a preferred embodiment of my invention wherein various changes and modifications may be made as to the detailed construction and arrangement of parts without departing from the scope of the claims, and in which drawing—

Figure 1 is a perspective view of my invention as applied in severing tree-limbs with the showing of a tree-trunk and a limb thereof in connection with the device or saw. Fig. 2 is a side elevation of the saw and its attached handle, the saw-blade being only fragmentally shown. Fig. 3 is an edge elevation of the same. Figs. 4 and 5 are enlarged detailed side views of the attaching ends of the saw-handle and the blade, respectively, the same being shown as mutilated with respect to their greater portions. Fig. 6 is a detailed view of a portion of a saw having teeth adapted to cut in both directions.

In carrying out my invention, I provide the blade 1 with teeth 2, in this instance as arranged for a forward or drawing cutting action and a pushing non-cutting action, the blade upon its pushing or non-cutting action providing for freeing itself of the resultant particles of the kerf formation. Or, the blade may be provided with teeth 4, as disclosed by Fig. 6, for cutting in both directions, if desired.

A handle or shaft 7 is provided for the blade, formed of sections 8 of about five feet in length and preferably joined together after the fashion of assembling fishing-rod sections, as for instance, by means of tubular ferrules or rings 9 fastened to one section adjoining ends of the sections being coupled together by a common ferrule or ring, of the requisite depth to provide for effecting such union, the purpose of this, of course, being to enable the user to suitably extend the saw up into the tree for reaching and sawing the limb or limbs it may be desired to sever, as in pruning or "topping" the tree. The handle or rod of thus formed jointed members or sections, has its upper or uppermost section or member preferably tapered and flattened at the blade-attaching end, and to the resultant flattened sides or surfaces thereof are suitably secured, by riveting or bolting, as at 10, flat metal-plates 11, the extreme upper slightly spaced terminals thereof being adapted to receive between them the saw-blade 1, as shown particularly in Figs. 2 and 3. The resultant extensions or terminals of the plates, being more or less resilient, provide for the snug forcing of the blade there-between, the blade being secured by means of a nut and washer-equipped clamping and adjusting bolt 12 passed through coincident or registering substantially cruciform-shaped orifices 13 in the plates 11 and a vertical slot 14 and an additional bolt 15, insertible through either of two coincident or registering apertures 16 in each of the plates 11 and through the slot 14 in the saw-blade. This arrangement of orifices, or apertures, slot, and bolts, provides for the positioning of the saw-blade at different angles to the handle or staff as may be required in effecting the severing of the tree-limb with convenience to the position of the operator or user of the saw.

I claim—

1. A saw of the type described, including a handle or staff, a blade, and fastenings, said handle having opposed plate-members provided with coincident substantially cruciform-shaped orifices and said saw-blade having an axial slot therein, said fastenings being inserted through said orifices and slot.

2. A saw of the type described, including a handle, a blade and fastenings, said blade having an axial slot therein and said handle having opposed plate-members provided with coincident substantially cruciform-shaped orifices and additional apertures, said fastenings being insertible through said orifices, additional apertures and axial slot.

In testimony whereof I affix my signature in the presence of two witnesses.

NICHOLAS E. DRAGOS.

Witnesses:
HAROLD CULBERT,
EMMETT C. SAYLES.

Copies of this patent may be obtained for five cents each, by addressing the "Commissioner of Patents, Washington, D. C."